United States Patent
Schurle et al.

(10) Patent No.: US 9,639,095 B2
(45) Date of Patent: May 2, 2017

(54) SANITARY FIXTURE

(71) Applicant: Neoperl GmbH, Mullheim (DE)

(72) Inventors: Holger Schurle, Mullheim (DE); Marc Tempel, Freiburg (DE)

(73) Assignee: NEOPERL GMBH, Mullheim (DE)

( * ) Notice: Subject to any disclaimer, the term of this patent is extended or adjusted under 35 U.S.C. 154(b) by 7 days.

(21) Appl. No.: 14/655,463

(22) PCT Filed: Dec. 3, 2013

(86) PCT No.: PCT/EP2013/003641
§ 371 (c)(1),
(2) Date: Jun. 25, 2015

(87) PCT Pub. No.: WO2014/117794
PCT Pub. Date: Aug. 7, 2014

(65) Prior Publication Data
US 2015/0354182 A1 Dec. 10, 2015

(30) Foreign Application Priority Data
Jan. 29, 2013 (DE) .................. 20 2013 000 860 U

(51) Int. Cl.
| | |
|---|---|
| A47K 1/14 | (2006.01) |
| G05D 23/08 | (2006.01) |
| E03C 1/04 | (2006.01) |
| F16K 31/00 | (2006.01) |
| F16K 3/08 | (2006.01) |
| E03C 1/08 | (2006.01) |
| G05D 23/02 | (2006.01) |
| G05D 7/01 | (2006.01) |
| E03C 1/02 | (2006.01) |

(52) U.S. Cl.
CPC ............... *G05D 23/08* (2013.01); *E03C 1/04* (2013.01); *E03C 1/041* (2013.01); *E03C 1/08* (2013.01); *F16K 3/08* (2013.01); *F16K 31/00* (2013.01); *F16K 31/002* (2013.01); *G05D 7/012* (2013.01); *G05D 23/022* (2013.01); *E03C 2001/026* (2013.01)

(58) Field of Classification Search
CPC ...................................................... E03C 1/262
USPC ..................................................... 4/286–295
See application file for complete search history.

(56) References Cited

U.S. PATENT DOCUMENTS

| | | |
|---|---|---|
| 3,500,899 A | 3/1970 | Shane, Jr. |
| 3,856,206 A | 12/1974 | Bell et al. |
| 5,642,859 A | 7/1997 | Ackroyd |
| 2012/0180875 A1 | 7/2012 | Keller et al. |

FOREIGN PATENT DOCUMENTS

| | | |
|---|---|---|
| FR | 1137522 | 5/1957 |
| GB | 2301169 | 11/1996 |
| WO | 2011006272 | 1/2011 |

*Primary Examiner* — Lori Baker
(74) *Attorney, Agent, or Firm* — Volpe and Koenig, P.C.

(57) ABSTRACT

In the case of a sanitary fixture (1), it is provided that at least one covering surface (7), by way of which at least one flow opening (4) of a flow element (3) is openable and at least partially closable in a temperature-dependent manner, is formed on a covering element (6) made of a temperature-sensitive material (cf. FIG. 1).

19 Claims, 4 Drawing Sheets

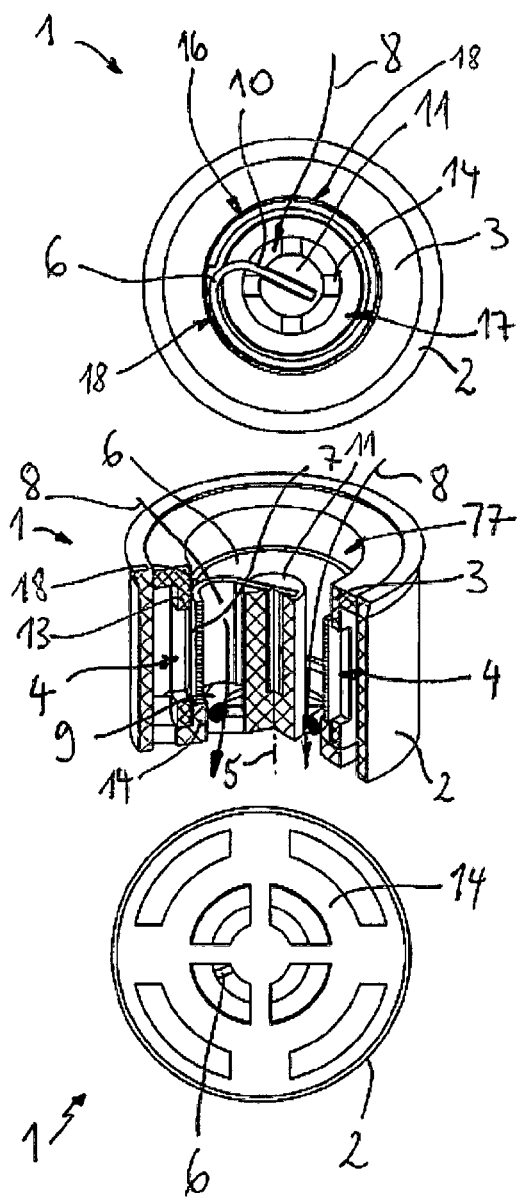
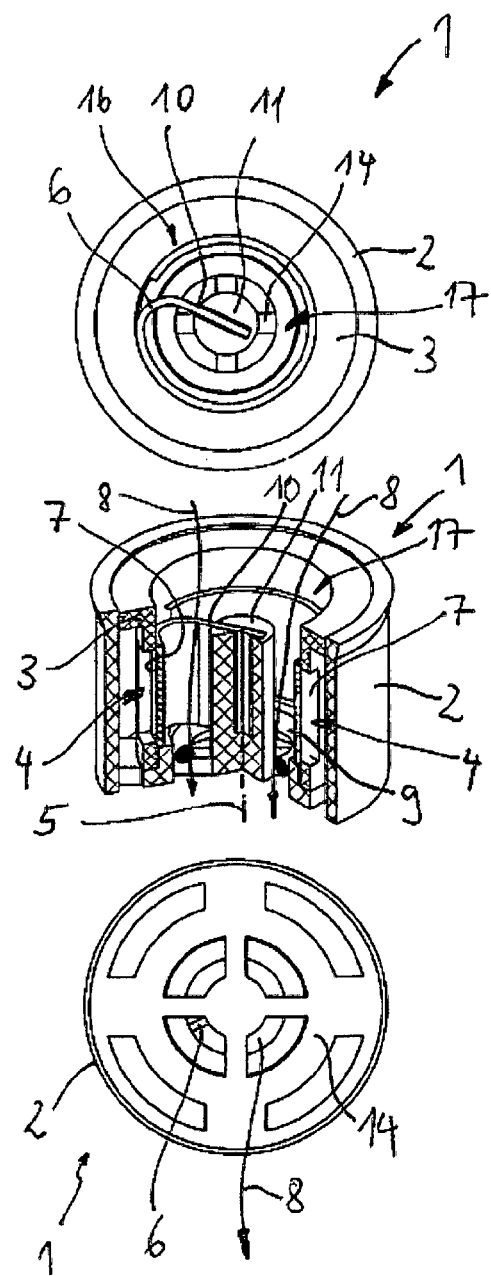
FIG. 1A
FIG. 1B

SANITARY FIXTURE

BACKGROUND

The invention relates to a sanitary fixture, with a throughflow element in which at least one throughflow opening is formed, wherein the at least one throughflow opening is releasable and at least partially closable by a covering element.

Sanitary fixtures of this type, for example, of ventilated and unventilated jet regulators, are known. It is known in this connection to activate the covering element depending on the temperature in order to achieve a different throughflow behavior at different temperatures of the water conducted through.

US 2012/90180875A1 discloses a flow limiter with a flat spring tongue, wherein the spring tongue closes a narrowed portion depending on a differential pressure.

SUMMARY

The invention is based on the object of providing an alternative variant with which a temperature-dependent functional behavior of the sanitary fixture can be achieved.

For this achievement, one or more features of the invention are provided. In particular, in order to achieve the object mentioned, it is therefore provided, according to the invention, in a sanitary fixture of the type described at the beginning that the covering element is composed of a temperature-sensitive regulating element, and that a covering surface interacting with the at least one throughflow opening for the release and for the at least partial closure is formed on the covering element, that the at least one throughflow opening is oriented radially with respect to a longitudinal axis of the sanitary fixture, and that the covering element is realized in a spirally curved manner, and/or that the covering element is in the shape of a band. It is advantageous here that it is possible to dispense with additional adjustable additional elements in order to achieve the temperature-dependent functional behavior. Very small overall dimensions can therefore be achieved. It is furthermore advantageous that a low number of parts are required for installing the sanitary fixture. It is particularly favorable if the covering surface is designed for completely closing the throughflow opening. By means of the possibility of switching the covering element in a temperature-sensitive manner between a state releasing the throughflow opening and a state at least partially, preferably completely, closing the throughflow opening, a functional behavior of the sanitary fixture can be set simply in a temperature-sensitive manner. For example, for this purpose, a further functional unit can be assigned behind the throughflow opening in the throughflow direction, which functional unit can be switched on by release of the throughflow opening and can be switched off by closure of same.

Through the use of a temperature-sensitive regulating element, the covering element can be changed or switched in a temperature-dependent manner between a state releasing the throughflow opening and a state at least partially, preferably completely, closing the throughflow opening.

The sanitary fixture can be, for example, an aerated or an unaerated jet regulator and/or volume regulator and/or a valve and/or a restrictor.

In one refinement of the invention, it can be provided that the covering element is formed as a single piece. It is advantageous here that the covering element can be fitted directly without additional installation steps. This simplifies the manufacturing and reduces the overall size required.

It can be provided, for example, that the covering element has a thermostatic bimetal. Thermostatic bimetals constitute an inexpensive and readily maneuverable possibility of achieving a variation in shape of the covering element.

Alternatively or additionally, it can be provided that the covering element has a material with shape memory. It is advantageous here that a sudden changeover can be achieved if a temperature threshold which characterizes a phase transition in the material with shape memory is exceeded or fallen short of. A macroscopic movement or a variation in shape of the covering element can therefore be achieved even with small temperature changes.

In a refinement of the invention, it can be provided that the temperature-sensitive regulating element is variable in shape depending on the temperature. It is advantageous here that the mentioned releasing state and the likewise mentioned, at least partially closing state can be achieved by a variation in the shape of the covering element.

In a refinement of the invention, it can be provided that a bending of the covering element is temperature-variable. It is advantageous here that a variation in the shape with which the covering element releases the at least one throughflow opening in a first state and at least partially closes same in a second state can be achieved in a simple manner.

In a refinement of the invention, it can be provided that the covering element is placeable flat onto the at least one throughflow opening. It is advantageous here that a complete closure of the throughflow opening can be achieved.

It can be provided, for example, that the temperature-sensitive regulating element of the covering element takes up, depending on the temperature, a hard state in which it produces a force which is directed counter to a flow through the at least one throughflow opening. It is advantageous here that a closing of the at least one throughflow opening, through which the flow passes, against the flow or an opening or release of the at least one throughflow opening counter to a water pressure on the covering element can be achieved depending on the temperature.

In a refinement of the invention, it can be provided that the covering element is arranged on the flow inlet side of the at least one throughflow opening. It is advantageous here that use can be made of a covering element which, in a closing state, can be supported by a component forming the at least one throughflow opening. It is particularly favorable in this connection if, when a material with shape memory is used as the temperature-sensitive regulating element, the force mentioned for achieving the releasing state is set up.

Alternatively, it can be provided that the covering element is arranged on the discharge flow side of the at least one throughflow opening. It is advantageous here that an automatic release of the throughflow opening can be achieved by a flowing liquid. In this case, when a material with shape memory is used as the temperature-sensitive regulating element, the temperature-sensitive material can take up the hard state in the at least partially closing state. The temperature-sensitive regulating element of the covering element can thereby produce a force in a temperature-dependent manner, which force is directed counter to the flow movement.

In a refinement of the invention, it can be provided that the at least one throughflow opening forms a bypass to a main flow path of the sanitary fixture. It is advantageous here that a flow rate can simply be set in a temperature-dependent manner.

In a refinement of the invention, it can be provided that the at least one throughflow opening is arranged radially outside a, in particular the already mentioned, main flow path of the sanitary fixture. It is advantageous here that compact functional units can be used in the main flow path.

In a refinement of the invention, it can be provided that the covering element annularly surrounds a, in particular the already mentioned, main flow path of the sanitary fixture. For this purpose, a plurality of throughflow openings which each branch off from the main flow path are preferably formed. It is advantageous here that an entire or complete circumference of the main flow path is usable transversely with respect to the flow direction thereof for the formation of further functional units or a bypass.

In a refinement of the invention, it can be provided that the covering element is fastened at one end to a housing part. It is advantageous here that a variation in shape can be carried out in a defined manner by the covering element being supported or secured on a fixed housing part.

In a refinement of the invention, it can be provided that the at least one throughflow opening is oriented radially with respect to a longitudinal axis of the sanitary fixture. It is advantageous here that a lateral branching from a main flow path can be formed, as a result of which a short overall length can be achieved.

In this connection or in general, it can be provided that the covering element is realized in a spirally curved manner. It is advantageous here that a large length of the temperature-sensitive regulating element can be accommodated within a small construction space, and therefore macroscopic variations in shape can be achieved, for example, with a thermostatic bimetal, even in the event of small changes in temperature. By means of these macroscopic variations in shape, the covering element can be switched between the releasing state and the at least partially closing state.

In a refinement of the invention, it can be provided that the covering element is in the shape of a band. It is advantageous here that a multiplicity of covering surfaces can be formed on the covering element, which covering surfaces in each case release or at least partially close a throughflow opening depending on the temperature.

Unless otherwise stated, the terms "radially" and "axially" are related to a longitudinal axis of the sanitary fixture.

In the refinement of the invention, it can be provided that the covering element is clamped in a cup-shaped receptacle having a round receptacle wall, wherein the at least one throughflow opening is formed in the round receptacle wall. It is advantageous here that a supporting of the covering element, for example by means of a base of the cup-shaped receptacle, can be achieved in a simple manner. It is furthermore advantageous that radially oriented throughflow openings can be formed in a simple manner.

It is particularly favorable if a plurality of throughflow openings are closable and releasable by the covering element. It is advantageous here that a releasable flow cross section can be increased.

In a refinement of the invention, it can be provided that the at least one throughflow opening is oriented axially with respect to a longitudinal axis of the sanitary fixture. It is advantageous here that small dimensions can be achieved transversely with respect to the longitudinal axis of the sanitary fixture.

In a refinement of the invention, it can be provided that the covering element has at least one flat tongue, at the free end of which the covering surface is formed. It is advantageous here that a throughflow opening is releasable and closable in a simple manner by a variation in shape of the tongue.

In a refinement of the invention, it can be provided that the covering element is arranged on a support, wherein the at least one throughflow opening is formed in the support. It is advantageous here that a stop and/or a supporting of the covering element in the closing state can be formed by the support. The support is preferably of flat design in order to achieve good closability of the at least one throughflow opening.

In a refinement of the invention, it can be provided that the covering element has at least one tongue which, in a releasing state of the covering element, encloses a gap with the or a support. It is advantageous here that water can flow through the released throughflow openings. Alternatively or additionally, it can be provided that a tongue, for example the already mentioned tongue, of the covering element, in an at least partially closing state of the covering element, at least partially, preferably completely, closes the at least one throughflow opening. It is advantageous here that an opening of the throughflow opening can be achieved by a variation in the position of the tongue. This variation in the position of the tongue can be brought about in a simple manner by a temperature-dependent variation in the shape of the covering element.

In a refinement of the invention, it can be provided that the covering element has a plurality of tongues which are each assigned to a throughflow opening. It is advantageous here that a plurality of throughflow openings are releasable and closable. It is preferably provided that the tongues are arranged in a star-shaped manner.

BRIEF DESCRIPTION OF THE DRAWINGS

The invention is now described with reference to exemplary embodiments, but is not limited to these exemplary embodiments. Further exemplary embodiments emerge through combining the features of individual claims or of a plurality of claims with one another and/or with individual features or a plurality of features of the exemplary embodiments.

In the drawings:

FIGS. 1A and 1B show, in different views, a sanitary fixture according to the invention with a releasing and at least partially closing covering element.

DETAILED DESCRIPTION OF THE PREFERRED EMBODIMENTS

Figures 2A, 2B:
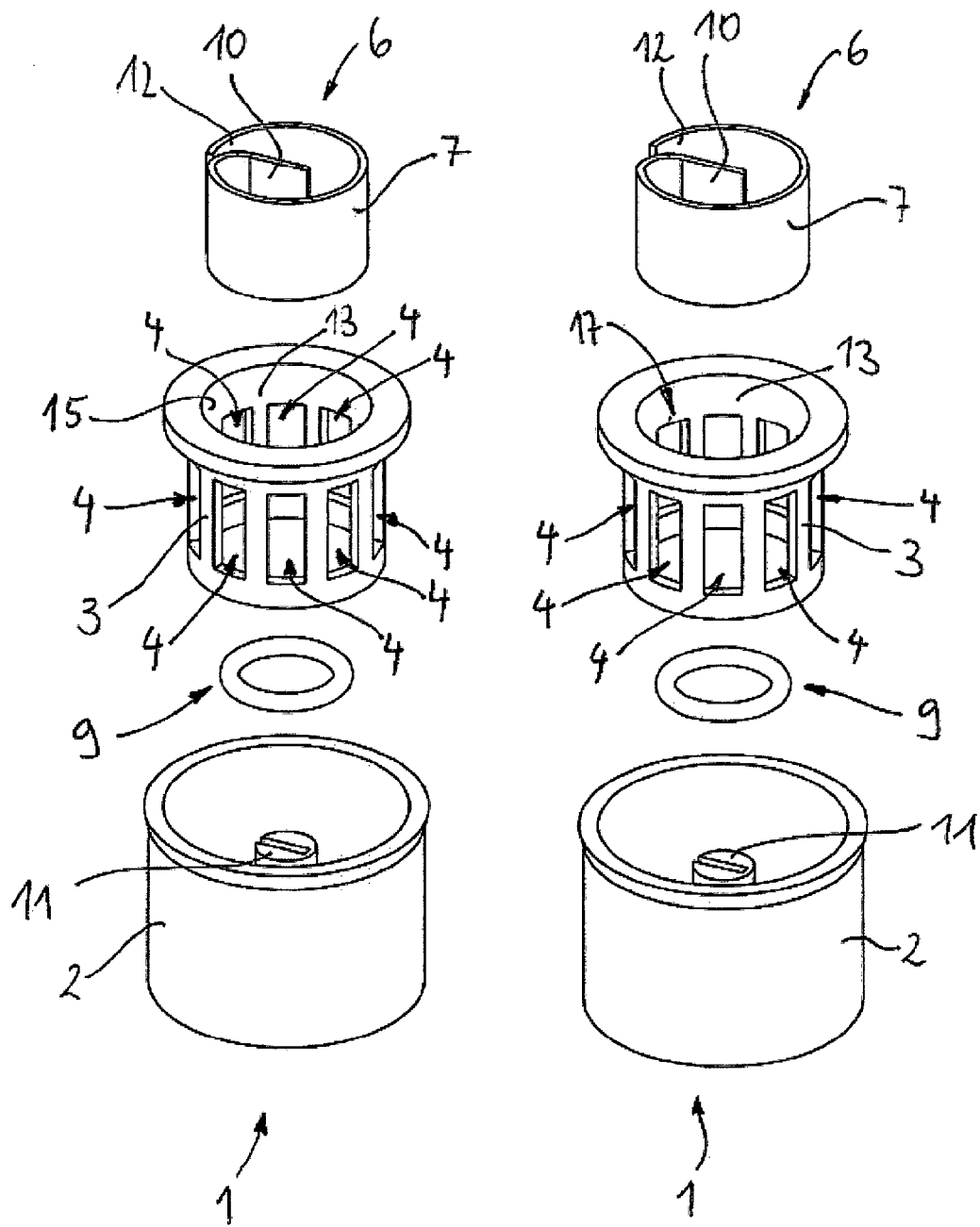
FIGS. 2A and 2B show, in an exploded illustration, the sanitary fixture according to FIGS. 1A and 1B in a releasing and at least partially closing state of the covering element.

FIGS. 1A and 1B show a sanitary fixture, which is denoted in its entirety by 1, with an outer sleeve 2 which is set up in a manner known per se for installing in the output of a fitting or at a different location of a water-conducting system.

A throughflow element 3 which is likewise sleeve-shaped is inserted into the outer sleeve 2.

Throughflow openings 4 are formed in the throughflow element 3.

In the exemplary embodiment shown, ten throughflow openings 4 distributed along a circumference are formed. In further exemplary embodiments, a different number of throughflow openings 4 are formed.

The throughflow openings 4 are oriented radially with respect to a longitudinal axis 5 of the fixture 1.

The throughflow openings 4 are releasable and at least partially closable by a covering element 6.

The covering element 6 here is manufactured from a temperature-sensitive material.

FIG. 1A and FIG. 2A show the covering element 6 in a state in which the throughflow openings 4 are released.

FIGS. 1B and 2B show the covering element 6 in a state in which the throughflow openings 4 are closed.

FIGS. 1A and 1B show, from the top downward, the fixture 1 on the approach flow side, in a partially sectioned, three-dimensional perspective view and on the discharge flow side.

Covering surfaces 7 which are coordinated with the throughflow openings 4 are formed radially on the outside of the covering element 6. Said covering surfaces 7 interact with the throughflow openings 4 in order to release or to close the throughflow openings 4 depending on the state of the covering element 6.

The temperature-sensitive material of the covering element 6 has the effect here that, in a first temperature range, the state according to FIG. 1A, i.e. the releasing state, is taken up, whereas, in a second temperature range, for example a higher temperature range, the closing state according to FIG. 1B is taken up.

It is apparent from FIGS. 1A and 1B and FIGS. 2A and 2B that the covering element 6 is formed as a single piece. The covering element 6 is formed as a spirally curved tongue 16.

The temperature-sensitive material of the covering element 6 here causes a variation in the shape of the covering element 6 depending on the temperature, said variation in the shape being visible in FIGS. 2A and 2B, for example, at a changed circumference of the covering element 6.

In the releasing state of the covering element 6 according to FIGS. 1A and 2A, the tongue 16 forms a gap 18. Water can flow through the gap 18 into the throughflow openings 4. In the closing state of the covering element 6 according to FIGS. 1B and 2B, the gap 18 is closed, and the covering element 6 closes the throughflow openings 4.

In the presented exemplary embodiment, the covering element 6 is manufactured by a thermostatic bimetal or has such a thermostatic bimetal.

The effect achieved by this is that the bending of the covering element 6 is temperature-variable, and therefore the covering element 6 has a larger circumference in FIG. 2B than in FIG. 2A.

The covering element 6, with the covering surfaces 7 thereof formed on the covering element 6, therefore bear flat against the throughflow openings 4 in order to close same.

The sanitary fixture 1 has a main flow path 8 through which the water flows in every state of the covering element 6. It is apparent that the covering element 6 is arranged on the approach flow side of the throughflow openings 4.

A functional unit 9, which is known per se and is shown here as a volume regulator unit, is arranged in the main flow path 8. In further exemplary embodiments, this volume regulator unit can be replaced or supplemented, for example, by a jet-shaping unit and/or a jet aeration unit or by another functional unit.

The possibility of a bypass to this main flow path 8 and the functional unit 9 is provided by the releasable throughflow openings 4.

The throughflow openings 4 are arranged radially here outside the main flow path 8 of the sanitary fixture.

The covering element 6 annularly surrounds said main flow path 8 of the sanitary fixture 1 radially on the outer side.

The covering element 6 is fastened at a fixed end 10, the inner end of the spiral shape, to a housing part 11.

The spirally curved covering element 6 is supported at the free end 12 thereof on the throughflow element 3.

Overall, the covering element 6 is therefore arranged in a cup-shaped receptacle 17 which is formed by a round receptacle wall 13 of the throughflow element 6 and a base 14.

The base 14 of said cup-shaped receptacle 17 supports the covering element 6 and bears the stub-shaped housing part 11.

The base 14 is fixedly connected to the outer sleeve 2.

The receptacle wall 13 therefore forms supports 15 for the covering surfaces 7 for closing the throughflow openings 4. In the releasing state of the covering element 6, the gap 18 is therefore formed between the tongue 16 and the supports 15.

Figure 3A:
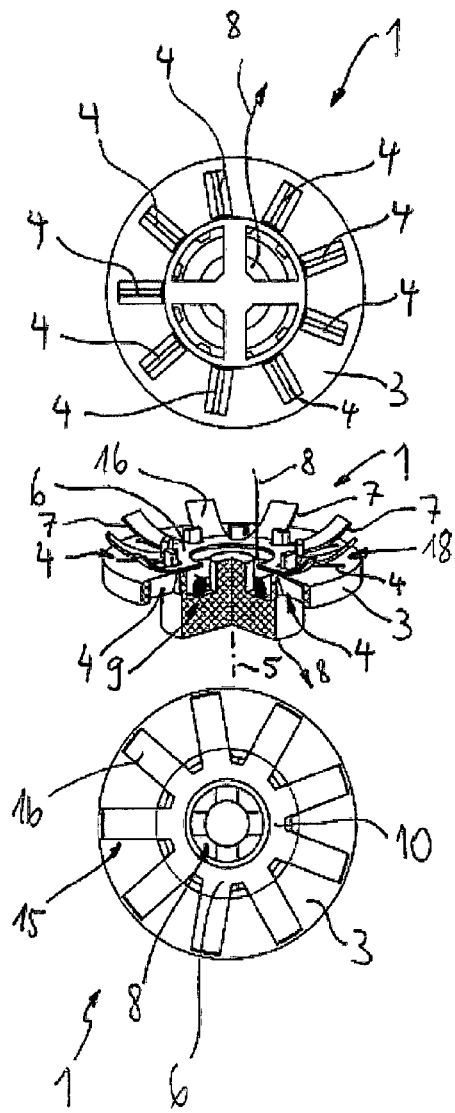
FIGS. 3A and 3B show, in different views, a further sanitary fixture according to the invention with a releasing and at least partially closing covering element.
Figure 3B:
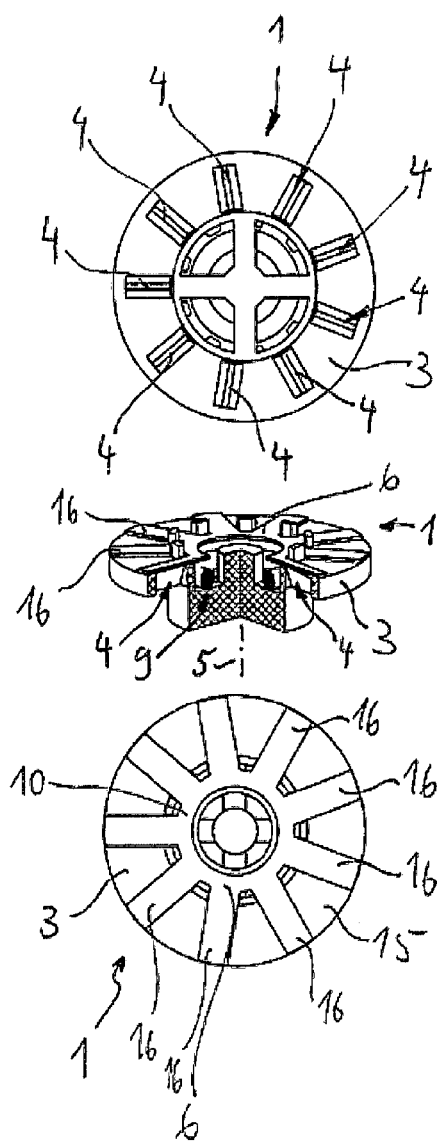
Figure 4A:
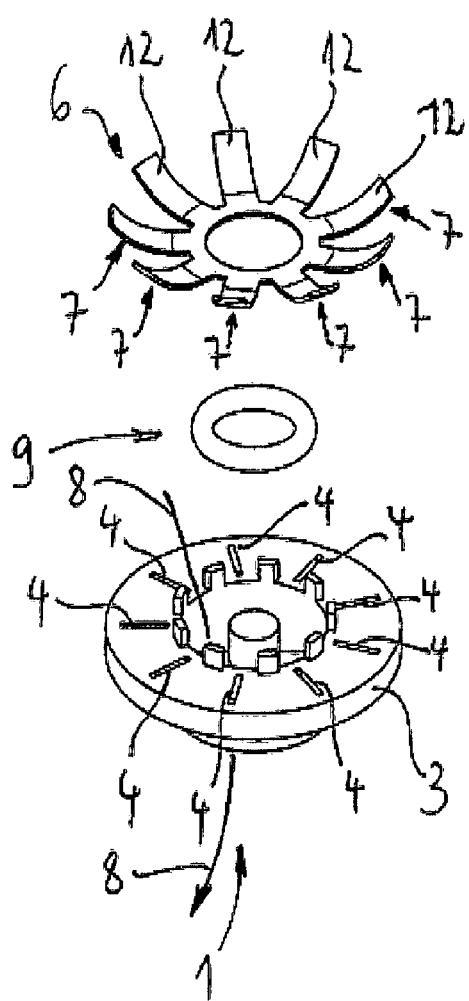
FIGS. 4A and 4B show, in an exploded illustration, the sanitary fixture according to FIGS. 3A and 3B.
Figure 4B:
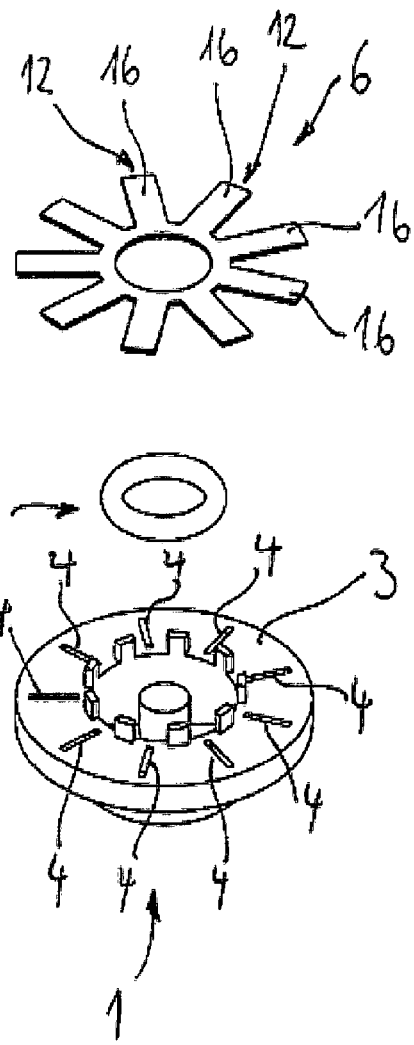

FIGS. 3A and 3B and FIGS. 4A and B show a further exemplary embodiment according to the invention of a sanitary fixture 1. Components and functional units which are similar or identical functionally and/or structurally to the exemplary embodiment according to FIGS. 1A and 1B and FIGS. 2A and 2B are denoted by the same reference numbers and are not described separately once again. The statements with regard to FIGS. 1A and 1B and FIGS. 2A and 2B therefore apply correspondingly to FIGS. 3A and 3B and FIGS. 4A and B.

FIG. 3A and FIG. 4A both show the sanitary fixture 1 with a covering element 6 which is in a releasing state. Water can flow through the throughflow openings 4 in this state. The right halves of the drawing in each case show the covering element 6 in a closing state. In this state, the throughflow openings 4 are closed.

The exemplary embodiment according to FIGS. 3A and 3B and FIGS. 4A and B differs from the exemplary embodiment according to FIGS. 1A and 1B and FIGS. 2A and 2B in that the throughflow openings 4 are oriented axially, i.e. parallel to the longitudinal axis 5 of the fixture 1.

The upper third of FIGS. 3A and 3B shows the view on the discharge flow side, the center shows a partially sectioned perspective view and the lower third shows the view on the approach flow side. The covering element 6 is therefore arranged on the approach flow side of the throughflow openings 4.

The covering element 6 has tongues 16 which, in the closing state of the covering element 6, are flat and close the throughflow openings 4.

At the free ends 12, a respective covering surface 7 is formed in a manner matching the clear opening of the throughflow opening 4, and therefore a throughflow opening 4 is closable by each tongue 16. At the fixed ends 10 of the covering element 6, the tongues 16 are connected to one another.

In the closing state of the covering element 6 according to FIGS. 3A and 3B and FIGS. 4a and 4B, the covering element 6 rests against the flat support 15 in which the throughflow openings 4 are formed.

In the releasing state of the covering element 6, the tongues 16 are bent upward counter to the force of the flowing water. The tongues 16 together with the supports 15 form gaps 18 through which the water can flow into the throughflow openings 4.

FIGS. 3A and 3B and FIGS. 4A and 4B show a sanitary fixture in which nine throughflow openings are formed. In further exemplary embodiments, other numbers and/or shapes of throughflow openings 4 are formed.

In the described exemplary embodiments and further exemplary embodiments, the throughflow openings 4 are of slot-shaped design. In this connection, the opening cross section of the throughflow openings 4 can increase away from the covering element 6, as is apparent in FIGS. 3A and 3B.

In further exemplary embodiments, the covering elements 6 are arranged on the discharge flow side of the throughflow openings 4.

In the case of the sanitary fixture 1, it is proposed to form at least one covering surface 7 on a covering element 6 made of a temperature-sensitive material, with which covering surface 7 at least one throughflow opening 4 of a throughflow element 3 is releasable and is at least partially closable depending on the temperature.

LIST OF REFERENCE NUMBERS 1 sanitary fixture
2 outer sleeve
3 throughflow element
4 throughflow opening
5 longitudinal axis
6 covering element
7 covering surface
8 main flow path
9 functional unit
10 fixed end
11 housing part
12 free end
13 receptacle wall
14 base
15 support
16 tongue
17 receptacle
18 gap

The invention claimed is:

1. A sanitary fixture (1), comprising: a throughflow element (3) in which at least one throughflow opening (4) is formed, a covering element (6) by which the at least one throughflow opening (4) is releasable and at least partially closeable, the covering element (6) comprises a temperature-sensitive regulating element, and a covering surface (7) interacting with the at least one throughflow opening (4) for the release and for the at least partial closure is formed on the covering element (6), the at least one throughflow opening (4) is oriented radially with respect to a longitudinal axis (5) of the sanitary fixture (1), and the covering element (6) is at least one of spirally curved, or band-shaped.

2. The sanitary fixture (1) as claimed in claim 1, wherein the covering element (6) is formed as a single piece.

3. The sanitary fixture (1) as claimed in claim 1, wherein the covering element (6) has at least one of a thermostatic bimetal or a material with shape memory.

4. The sanitary fixture (1) as claimed in claim 1, wherein a bending of the covering element (6) is temperature-variable.

5. The sanitary fixture (1) as claimed in claim 1, wherein the covering element (6) is arranged on an in-flow side or discharge flow side of the at least one throughflow opening (4).

6. The sanitary fixture (1) as claimed in claim 1, wherein the at least one throughflow opening (4) forms a bypass to a main flow path (8) of the sanitary fixture (1).

7. The sanitary fixture (1) as claimed in claim 1, wherein the at least one throughflow opening (4) is arranged radially outside a main flow path (8) of the sanitary fixture (1).

8. The sanitary fixture (1) as claimed in claim 1, wherein the covering element (6) annularly surrounds a main flow path (8) of the sanitary fixture (1).

9. The sanitary fixture (1) as claimed in claim 1, wherein the covering element (6) is fastened at one end (10) to a housing part (11).

10. The sanitary fixture (1) as claimed in claim 1, wherein the covering element (6) is clamped in a cup-shaped receptacle (17) having a round receptacle wall (13), and the at least one throughflow opening (4) is formed in the round receptacle wall (13).

11. The sanitary fixture (1) as claimed in claim 1, wherein there are a plurality of the throughflow openings (4) that are closeable and releasable by the covering element (6).

12. The sanitary fixture (1) as claimed in claim 1, wherein the at least one throughflow opening (4) is also oriented axially with respect to the longitudinal axis (5) of the sanitary fixture (1).

13. The sanitary fixture (1) as claimed in claim 1, wherein the covering element (6) has at least one flat tongue (16), at a free end (12) of which the covering surface (7) is formed.

14. The sanitary fixture (1) as claimed in claim 1, wherein the covering element (6) has at least one tongue (16) which, in a releasing state of the covering element (6), encloses a gap (18) with a support (15), and which, in an at least partially closing state of the covering element (6), at least partially closes the at least one throughflow opening (4).

15. The sanitary fixture (1) as claimed in claim 1, wherein the covering element (6) has a plurality of tongues (16) which are arranged in a star-shaped manner and which are each assigned to one of a plurality of the throughflow opening (4).

16. The sanitary fixture as claimed in claim 1, wherein the temperature-sensitive regulating element is variable in shape depending on a temperature.

17. The sanitary fixture as claimed in claim 1, wherein the covering element (6) is placeable flat onto the at least one throughflow opening (4).

18. The sanitary fixture as claimed in claim 1, wherein the covering element (6) is arranged on a flat support (15), and the at least one throughflow opening (4) is formed in the flat support (15).

19. The sanitary fixture as claimed in claim 1, wherein the covering element (6) has at least one tongue (16) which, in an at least partially closing state of the covering element (6), at least partially closes the at least one throughflow opening (4).

* * * * *